Jan. 4, 1966   F. SEGREST   3,227,309
INFLATING DEVICE WITH MEANS FOR TESTING THE CONDITION
OF A CHARGING CARTRIDGE
Filed Aug. 18, 1964   6 Sheets-Sheet 2

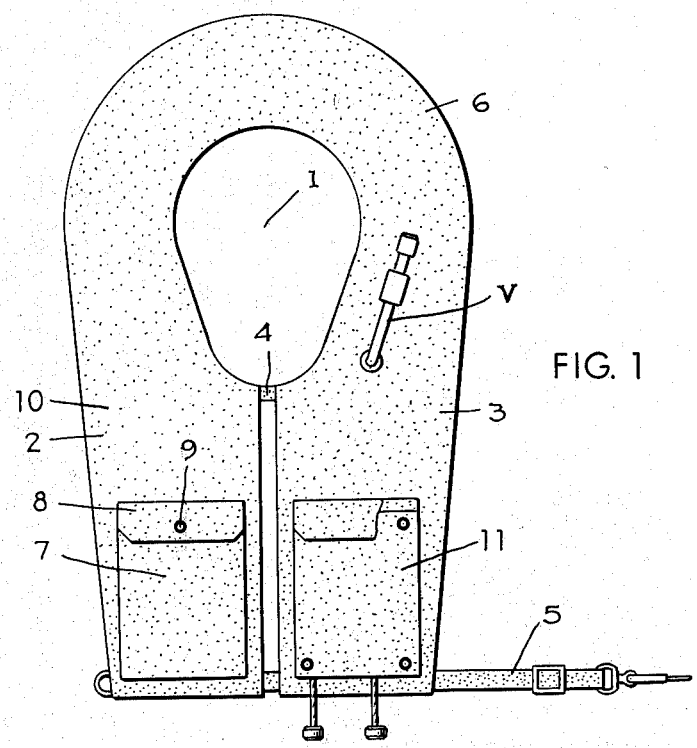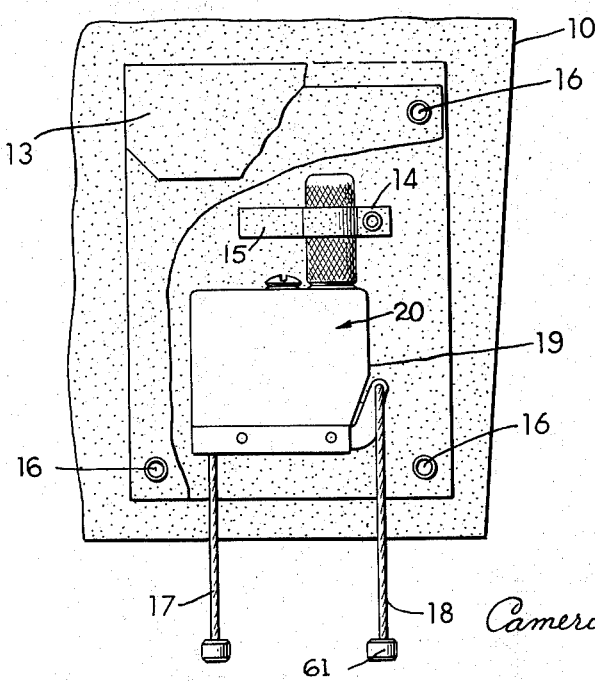

INVENTOR.
FRANK SEGREST
BY
Cameron, Kerkam & Sutton
ATTORNEYS

Jan. 4, 1966  F. SEGREST  3,227,309
INFLATING DEVICE WITH MEANS FOR TESTING THE CONDITION
OF A CHARGING CARTRIDGE
Filed Aug. 18, 1964  6 Sheets-Sheet 3

INVENTOR.
FRANK SEGREST
BY
Cameron, Kerkam & Sutton
ATTORNEYS

Jan. 4, 1966               F. SEGREST              3,227,309
INFLATING DEVICE WITH MEANS FOR TESTING THE CONDITION
OF A CHARGING CARTRIDGE
Filed Aug. 18, 1964                                 6 Sheets-Sheet 4

INVENTOR.
FRANK SEGREST
BY
Cameron, Kerkam & Sutton
ATTORNEYS

Jan. 4, 1966    F. SEGREST    3,227,309
INFLATING DEVICE WITH MEANS FOR TESTING THE CONDITION
OF A CHARGING CARTRIDGE
Filed Aug. 18, 1964    6 Sheets-Sheet 5

INVENTOR.
FRANK SEGREST
BY
Cameron, Kerkam &Sutton
ATTORNEYS

INVENTOR.
FRANK SEGREST
BY
Cameron, Kerkam & Sutton
ATTORNEYS

United States Patent Office 3,227,309
Patented Jan. 4, 1966

3,227,309
INFLATING DEVICE WITH MEANS FOR TESTING THE CONDITION OF A CHARGING CARTRIDGE
Frank Segrest, Lafayette, La., assignor of seventy-five percent to Jack L. Hearrell, Gladewater, Tex.
Filed Aug. 18, 1964, Ser. No. 390,350
16 Claims. (Cl. 222—1)

This invention relates to inflating devices for floatation equipment and more particularly to an inflating device of the type utilizing a compressed gas cartridge which is adapted to be automatically operated to inflate such equipment upon immersion in water with provision for manual actuation of the inflating device by the user.

Even more particularly, this invention relates to an inflating device having means for testing the charge of the compressed gas cartridge to assure the presence of the charge for inflating the floatation equipment.

More and more, people are utilizing their leisure time to enjoy the benefits of boating, water skiing, swimming, fishing and the like. This increase in aquatic activity as a means of relaxation has unfortunately resulted in a steadily mounting death toll due to drowning and a considerable financial loss to boat owners whose boats are often lost by sinking. It is therefore most desirable that floatation equipment be provided which is absolutely dependable in use and which is not subject to failure due to malfunctioning of parts or loss of the charge of the compressed gas cartridge.

There are several different types of floatation equipment on the market, the most common being that filled with a buoyant material such as kapok, foam rubber and the like. This type of floatation equipment has many disadvantages. They are inclined to deteriorate over a period of time and are very bulky, requiring large areas to be set aside for storage. In the case of life preservers, they are uncomfortable to wear and are therefore not suitable for use when the wearer is required to be active physically, as in the practice of water sports or when the wearer is working on or adjacent to the water.

Because of these disadvantages, there has been developed in recent years inflatable floatation equipment which can be inflated with gas upon manual actuation of a valve. This type of life preserver has proven to be undesirable, because in many instances the user will not have time to actuate the inflating device; such as in the case where the user may be injured by a fall into the water and so be incapable of actuating the inflating device or where the user may be unable to actuate the inflating device because of extreme excitement and the like.

Still further advancements in the development of floatation equipment have resulted in automatically inflatable devices which overcome many of the disadvantages of earlier arrangements. Such automatically inflatable devices generally utilize a compressed gas cartridge such as, for example, the commonly available $CO_2$ cartridge. Upon puncturing of the charged cartridge, its charge is caused to inflate the floatation device which may be a life preserver, float, tube or the like, depending on the particular use to which it is applied. The inflating mechanism is generally actuated automatically upon immersion in water, and often includes means for manual actuation.

The utilization of compressed gas cartridges for charging floatation equipment has enjoyed a rapid commercial success; however, these arrangements are subject to a serious disadvantage in that the cartridges are sealed until the time of use when they are punctured to inflate the associated floatation equipment. Accordingly, should the compressed gas cartridge malfunction or the piercing instrument be dulled so that the charge is retained in the cartridge, disaster results.

In my U.S. Patent No. 3,090,979 there is disclosed for the first time, a life preserver which the wearer can test to be absolutely certain that the compressed gas cartridge and inflating device is operative. To this end, a compressed gas cartridge is pierced to allow the escaping gas to fill a chamber which is closed to the life preserver. Valve means are provided which control the inflation of the life preserver. By raising the valve stem slightly so that the opening to the life preserver is slightly open, gas under pressure which passes through the restricted opening will provide an audible signal such as a whistle to indicate to the wearer that the life preserver is ready for instantaneous use. If the test shows the compressed gas cartridge to be defective, a new cartridge can be rapidly inserted in its place.

Despite the many advantages offered by such operation, as a practical matter, it is often found that life preservers are stored on boats for long periods of time and the user does not test the availability of the charge until the boat is under way. Because the whistle produced is of a low volume, it often cannot be heard over the environmental noise present due to winds, rain, rushing water or operation of a motor. In addition, the valve member is subject to sticking which prevents instantaneous inflation in case of emergency.

Accordingly, it is desirable when providing means for testing the charge of a compressed gas cartridge used for inflating floatation equipment, that resort be made to arrangements which provide other then an audible signal and which are positively foolproof.

It is therefore a primary object of the present invention to provide an improved inflating device for floatation equipment which provides a foolproof means for testing the charge of a compressed gas cartridge.

Another object of the present invention is to provide an improved inflating device for floatation equipment which avoids the use of valves and consequent maintenance required therefor.

A further object of the present invention is to provide an improved inflating device for floatation equipment which utilizes the pressure of the charging gas to provide an instant indication that the charge is operable and ready for use.

Another object of the present invention is to provide an improved method and apparatus for sensing or testing the availability of the charge of a compressed gas cartridge.

Yet another object of the present invention is to provide an improved inflating device having means for testing the availability of charge of a compressed gas cartridge in all types of environments.

In accordance with the present invention, the prior art disadvantages are overcome by a simple, valveless, inflating device which utilizes the pressure of the charge to provide a foolproof indication of the availability of a charge without losing any of the charge. To this end, the inflating device of the present invention is provided with a pressure chamber which maintains the charge from the compressed gas cartridge under pressure after the cartridge is pierced by a piercing mechanism. The pressure within the chamber acts against the piercing mechanism so that any tug or pull on the piercing mechanism pull cord is resisted by the pressure in the chamber. This resistive force gives an instant indication that the charge is available for use, for were the charge spent, the pull cord could be moved freely.

The following advantages are obtained by the novel inflating device construction of the present invention including almost instantaneous inflation of the floatation equipment when submerged in water; the floatation equipment can be easily tested for operability; the compressed gas cartridge can be easily tested to insure that it is not spent and empty; testing of the compressed gas cartridge does not rely on any audible signal and thus is not subject to be drowned out by environmental noises; the inflating device can be manually actuated and will be actuated automatically if the user fails to actuate the valve manually when the inflating device is immersed in water; the inflating device is valveless and thus not subject to inoperativeness due to faulty or sticky valves, automatic actuation of the inflating device can be eliminated so that it can be inflated only by manual actuation; the manual operating mechanism can be easily covered so that the floatation equipment will not be subject to accidental inflation; the inflating device is adapted for use with all types of inflatable floatation equipment and particularly life preservers enabling the life preserver to be light in weight and worn in complete comfort, as well as to be folded into a very small and light package. The flexibility and lightness of the uninflated floatation equipment allows it to be conveniently stored in a minimum of space; it can be used safely in any kind of weather, even in heavy rains, without danger of inflation; and it can be safely operated by anyone, even small children.

These and other objects and advantages of the present invention will appear from the following detailed description of one illustrative embodiment of the present invention. For purpose of illustration, the inflating device is shown as it would be used in connection with a life preserver; however, it should be readily apparent that it is adapted for use with all types of floatation equipment, and this illustrative embodiment should in no way be construed as defining or limiting the invention, since it will be apparent that the present invention is capable of various mechanical modifications.

While the specification concludes with claims particularly pointing out and distinctly claiming the subject matter of the present invention, the invention will be described with reference to the accompanying drawings, in which like reference characters indicate like parts throughout the several views:

FIG. 1 is a front view of a life preserver showing the position of the novel inflating mechanism of the present invention as used therewith;

FIG. 2 is a front view of the inflating mechanism construction used with the embodiment of FIG. 1;

Figure 3:
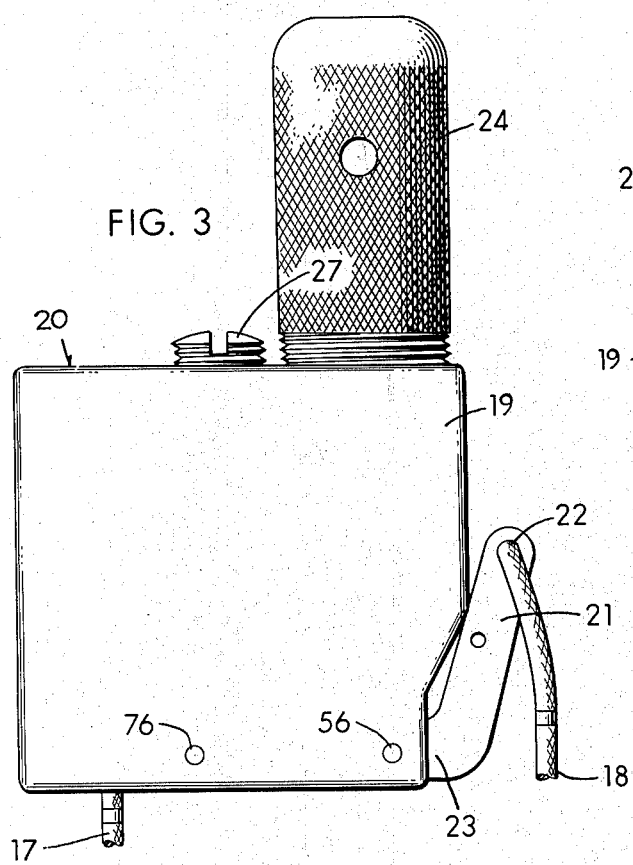
FIGS. 3–6 are front elevational, side elevational, top and bottom views, respectively, of the inflating mechanism of the present invention.
Figure 4:
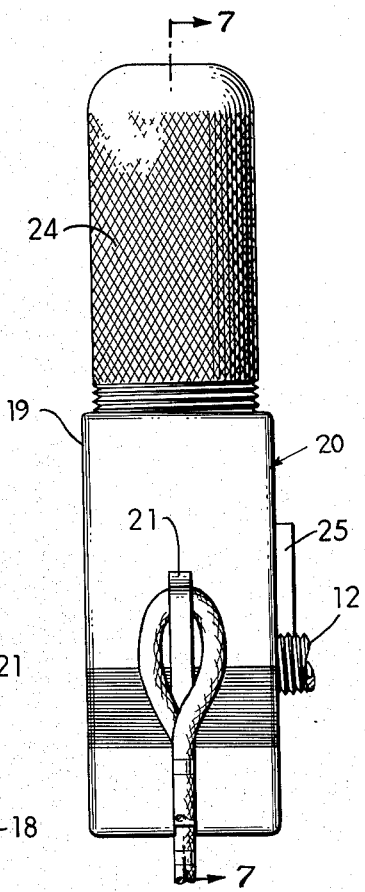
Figure 5:
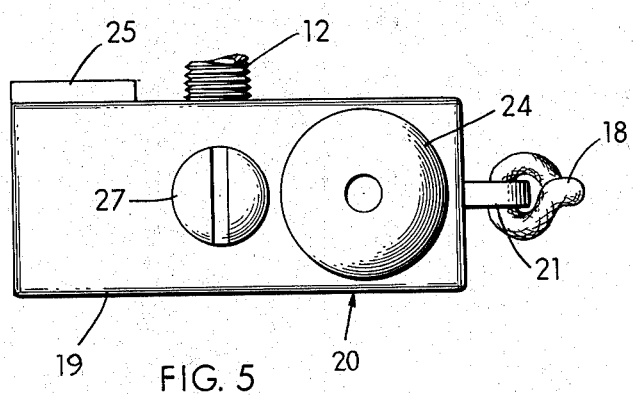

Referring now to the drawings, and more particularly to FIGS. 1–6, suitable floatation equipment, such as, for example, a life preserver is generally indicated at 10. As is well known in the art, the life preserver is made of lightweight gas impervious material, and is shaped to provide a head opening 1 with chest engaging portions 2 and 3 connected by a central tab 4 and adapted to be fastened to the body by a waist belt 5. The chest engaging portions 2 and 3 of the life preserver and its neck encircling connecting portion 6 are hollow and tubular, and are sealed at the ends to form an inflatable garment. A suitable pressure release valve V may be provided to deflate the life preserver after use.

Each chest portion is provided with an enclosure. Chest portion 2 is provided with a pocket 7 which can be used for any purpose including storage of extra compressed gas cartridges, if desired, and includes a flap 8 suitably secured to the chest portion and provided with a snap 9 to lock the flap 8 in place. An alternate type of enclosure is illustrated on the other chest portion 3 which utilizes a cover flap 11 suitably secured to the chest portion by means of snaps 16. The cover flap serves to enclose the inflating device 20 as more clearly illustrated in FIG. 2, wherein the cover flap 11 and its flap 13 have been partially removed to show the inflating mechanism 20 in its supported position. The inflating mechanism 20 is held in place by a suitable tie 15 secured at one end to chest portion 3 of the life preserver by a snap fastener 14. The bottom portion of the enclosing cover flap 11 is open between snaps 16 so as to allow pull cords 17 and 18 extending therefrom to hang freely.

Figure 9:
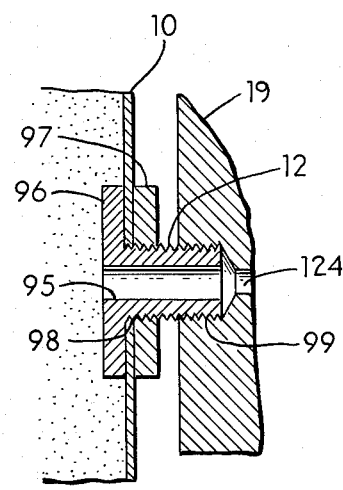
FIG. 9 is a partial, cross sectional view illustrating the manner of fastening the inflating mechnism to the floatation equipment.
Figure 6:
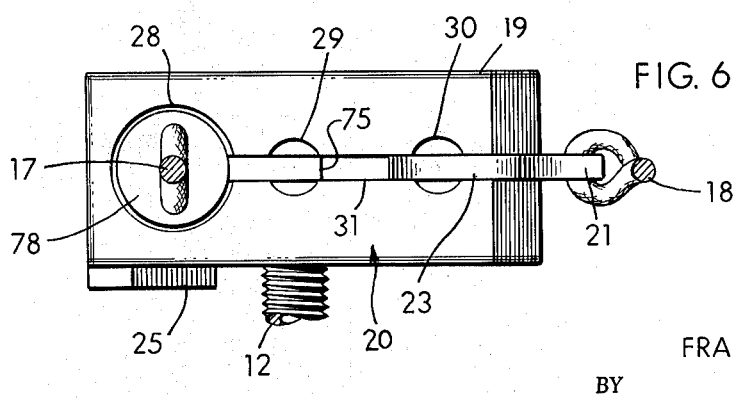

FIG. 9 illustrates in detail the manner of fastening the housing 19 to the floatation equipment 10. An axially bored fitting 12 is provided with external threads 98 adapted to be received in an internally threaded bore 99 suitably located in a housing 19. Axial bore 95 in fitting 12 is thus aligned with an open passage which terminates at orifice 124 in a chamber 29 which houses a diaphragm piercing mechanism. Fitting 12 is generally affixed to the floatation equipment prior to installation of the housing by insertion through an opening in the floatation equipment provided therefor. Head 96 bears against the inside surface of the material and is firmly attached by threaded fastening means 97. Generally, no further sealing is required; however, if desired, a suitable sealing gasket may be inserted under head 96.

Referring to FIGS. 3–6, the inflating device 20 is seen to comprise the housing 19 having a slide 25 and an axial bore for receiving the fitting 12 supported in the back side. The top of the housing is bored to receive a screw plug 27 and a threaded compressed gas cartridge cover 24. The bottom of the housing is bored to provide three vertically extending chambers 28, 29 and 30. Chamber 30 houses the compressed gas cartridge testing mechanism, chamber 29 houses the diaphragm piercing mechanism and chamber 28 houses the manual and automatic floatation equipment inflating or actuating mechanisms. A transverse slot 31 is provided along the base of the housing 19 adapted to receive the cartridge test lever 21 and manual actuation lever 75.

Figure 7:
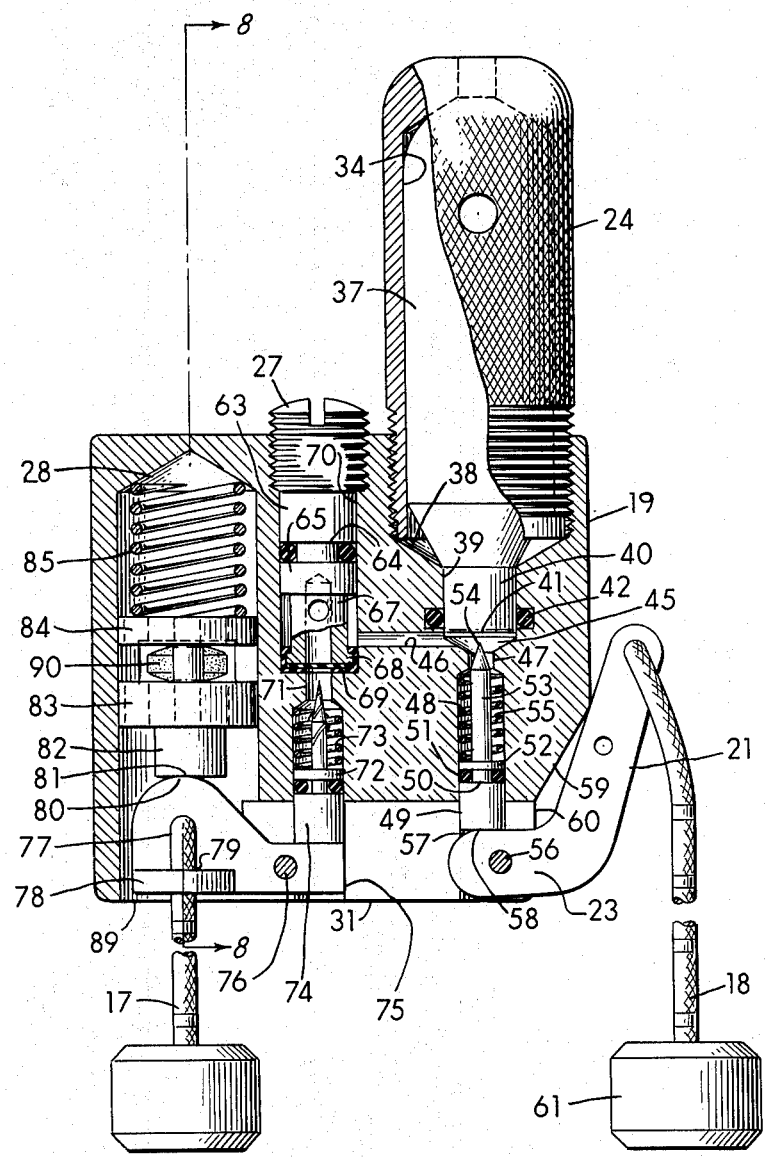
FIG. 7 is a front elevational view, partly in cross section, of the inflating mechanism of the present invention.
Figure 13:
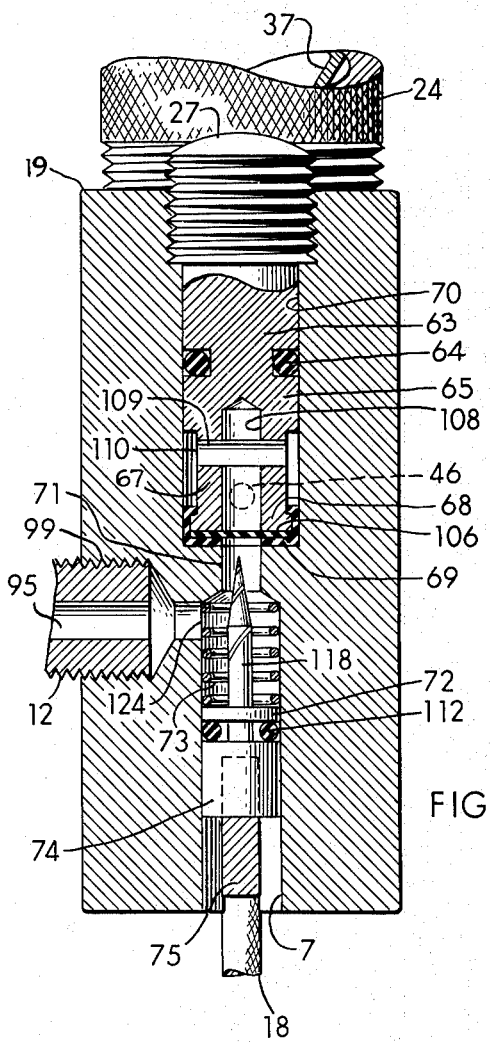
FIG. 13 is a view of the inflating mechanism diaphragm chamber of FIG. 7.

Referring to FIG. 7, the inflating device housing 19 is seen to comprise a compressed gas cartridge or capsule receiving chamber 38 provided with internal threads to receive a screw cap 24. The compressed gas cartridge 37 is of a known type and may be, for example, a $CO_2$ cartridge which fits snugly against the wall 34 of the screw cap 24 with its lower reduced neck portion 40 snugly engaging the walls of chamber 39 and terminating at a point such that an air space 45 is provided in communication with an internal channel 46. An O-ring 42 is provided to seal the neck 40 of the compressed gas cartridge in chamber 39.

The lower end of the inflating mechanism housing 19 is bored to provide a chamber 30 which receives the compressed gas cartridge testing or pressure sensing mechanism which is adapted to pierce the base 41 of the compressed gas cartridge by means of a pin or needle 53. Pin 53 is arranged to be retracted from the cartridge 37 after piercing by means of spring 48 and thus the tapered point 54 may be smooth. Cylindrical disc 52 is supported on pin 53 and is spaced from the top surface 50 of cylinder 49 to provide an annular groove or channel within which is positioned an O-ring 51 for sealing the chamber 55. The upper end of the chamber 55 is reduced in diameter as at 47 to provide means for guiding the piercing pin 53 when it is moved in position to pierce the base 41 of the compressed gas cartridge.

Within the chamber 55 and surrounding the pin 53 there is provided spring 48 which serves to return the piercing mechanism to its original position. One end of spring 48 bears against the reduced diameter portion 47 of the chamber 55 while the other end of spring 48 is supported and bears against the top of disc 52 so as to urge the cylinder 49 downwardly against the angled extension 23 of lever 21.

Operation of the piercing mechanism is affected through lever 21 which is pivoted about pin 56. The housing 19 is cut away as at 59 and 60 and slotted at 31 to receive the lever 21. Pull cord 18 is conveniently attached to the upper end of lever 21 and provided with a suitable gripping member 61.

In order to puncture the compressed gas cartridge, pull cord 18 is pulled downwardly thereby causing the surface 57 of the lever 21 to engage the bottom of cylinder 49. As the force of the spring 48 is overcome, pin 53 is raised upwardly so that its point pierces the base 41 of the compressed gas cartridge. On release of the pulling pressure on the pull cord 18, spring 48 causes the pin 53 to be retracted to its original position and the charge of the gas will enter and fill the open area between disc 52 and neck 40, as well as transverse passage 46 leading to the area sealed by a diaphragm 106 below the sealing screw plug 27. As long as the diaphragm 106 below the sealing plug remains unruptured, the pressure within these chambers is exerted on the lever 21.

Thus, once the compressed gas cartridge 37 is pierced, the piercing mechanism is returned to its original position and is maintained tight against the lever 21 by virtue of the pressure of the charge. Any attempt to raise the piercing mechanism by pulling on pull cord 18 will immediately detect the presence of this pressure and indicate to the user that the compressed gas cartridge 37 has been pierced and is ready for operation. In the event the compressed gas cartridge is faulty or its charge has been spent, no pressure build-up will occur within chamber 55, and a tug on pull cord 18 will result in free movement of a lever 21 about its pivot pin 56 indicating to the user that a new compressed gas cartridge should be immediately inserted.

The mechanism for releasing the charge to the flotation equipment is centrally located within the housing 19 which is bored as at 70 to receive a screw plug 27. Screw plug 27 is shaped to provide cylinder sections 63 and 65 which fit snugly within the bore and a cylinder section 67 of reduced diameter. Between sections 63 and 65, there is provided a groove to support O-ring seal 64 which seals the upper end of the bore 70. The lower end of section 67 is provided with a flanged or beveled end 68 which supports a sealing gasket 69. Sealing gasket 69 is open in the center so that the piercing pin 118 may pass freely therethrough. The reduced diameter section 67 of the screw plug 27 forms an annular chamber 110 thereabout which is maintained in communication with a central bore 108 provided in screw plug 27 by means of a transverse bore 109 drilled through the plug. The annular chamber 110, transverse bore 109 and central vertical bore 108 are sealed by means of a diaphragm 106 which is supported between the sealing gasket 69 and base of the flanged lower end 68 of the screw plug 27. Thus, diaphragm 106 in its unruptured condition limits the extent to which the charge from the punctured compressed gas cartridge 37 will flow.

Diaphragm 106 may be made of any suitable thin material and may be, for example, a thin membrane, fiber, plastic, silk, tin, bronze, brass, copper, rubber, alloys or even paper or cotton and the like. As the pressure from the compressed gas cartridge 37, when punctured, is maintained on the top of the diaphragm, only a very slight pressure is necessary in order for the piercing mechanism to puncture the diaphragm.

The lower central portion of the inflating device 19 is bored as at 29 to provide a chamber for receiving the piercing mechanism. The upper end of bore 29 is provided with a reduced diameter portion 71 which serves to prevent misalignment of the piercing pin 118 as it is moved upwardly to pierce the diaphragm 106.

Piercing pin 118 is suported within the chamber 29 on cylinder 74. A disc or shoulder portion 72 is supported on the piercing pin 118 and is slightly spaced from the cylinder 74 to provide an annular channel or groove within which O-ring 112 is placed. About the piercing pin 118 is positioned spring 73 having one end bearing against the reduced diameter portion 71 of the upper end of the bore 29 and its other end bearing on disc 72. Since the pressure within the chamber surrounding the screw plug 27 is maintained on top of diaphragm 10 and sealing gasket 69 is open at the center, very little pressure is needed to puncture the diaphragm 106. Thus, spring 73 need only exert a small compressive force.

The piercing mechanism is non-retractable and is preferably provided with a screw type pin having grooves 54 so that when the pin 118 punctures the disc 106, it tears a hole in the diaphragm 106 in such a way that the gas can escape from the central bore 108 in screw plug 24 through the grooves 54 of pin 118 into the lower chamber 29. In the case where pin 118 is of the smooth type, compression spring 73 would necessarily be required to have a suitable compressive force to return the piercing mechanism to its original position, otherwise, the pierced diaphragm may remain blocked.

Actuation of the piercing mechanism may be either manual or automatic. Manual operation of the piercing mechanism is effected through lever 75 which is pivoted adjacent one end at 76. The other end of lever 75 is provided with a wing extension 78. A hole 77 is conveniently drilled in the lever 75 and adapted to receive the pull cord 17 which extends through holes 79 provided on opposite sides of the wing member 78.

Figure 15:
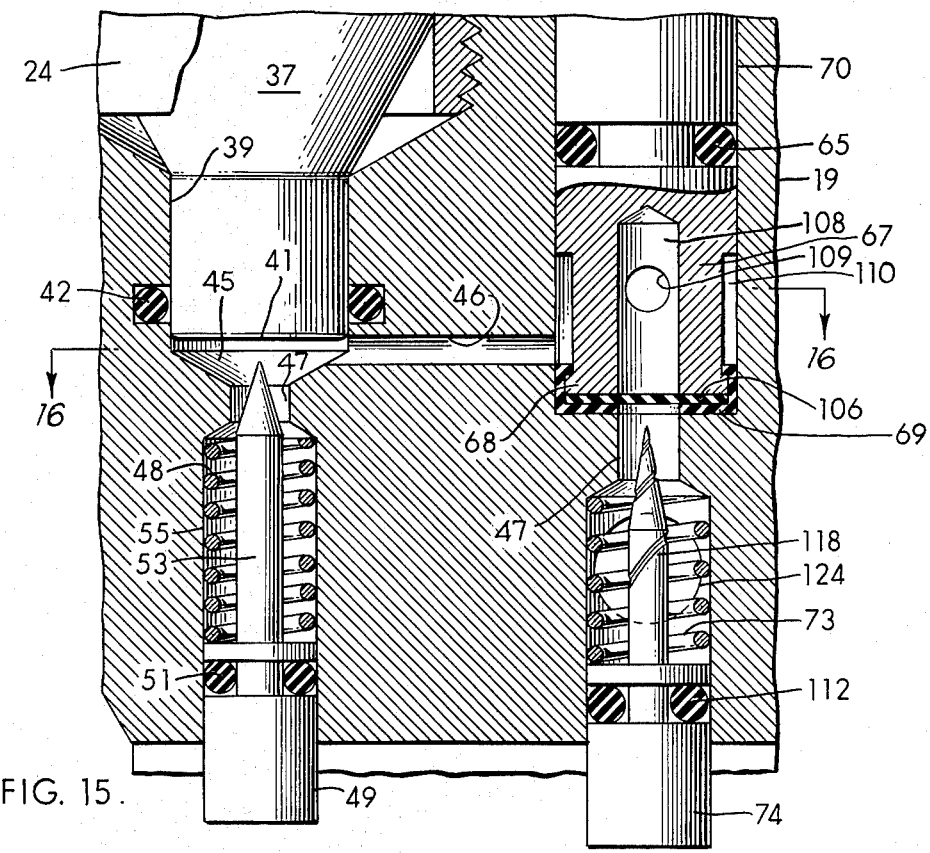
FIG. 15 is an enlarged, partial cross sectional view of the inflating mechanism particularly illustrating the pressure testing chamber and the diaphragm chamber.
Figure 16:
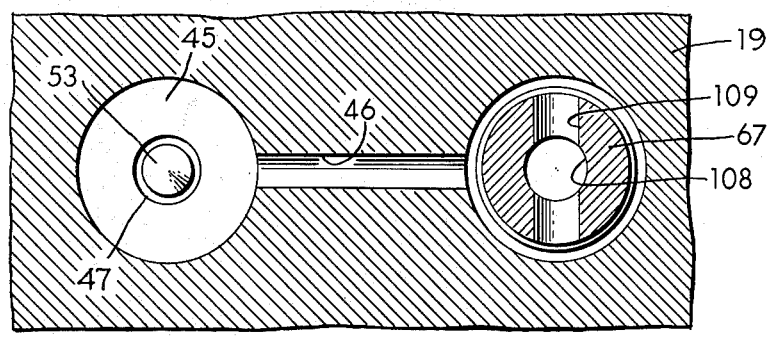
FIG. 16 is a view taken along lines 16—16 of FIG. 18.

For manual operation of the inflating device, a tug is exerted on the pull cord 17 which causes lever 75 to pivot about its pivot pin 76. Lever 75 acts against the base of cylinder 74 overcoming the force of compression spring 73 forcing pin 118 to puncture the diaphragm. The charge from the previously punctured compressed gas cartridge 37 which is maintained in the sealed chambers designated by numerals 45, 46, 110, 109, and 108 of FIG. 15, passes through the punctured cylinder and into the lower chamber 29 and through orifice 124 and the axially bored fitting 12 to the floatation equipment.

Figure 8:
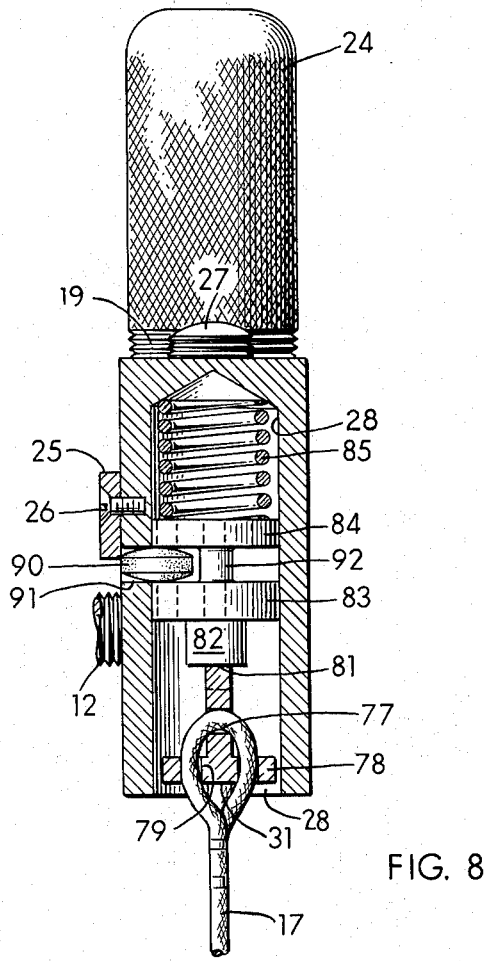
FIG. 8 is a view of the inflating mechanism taken along the lines 8—8 of FIG. 7.
Figure 12:
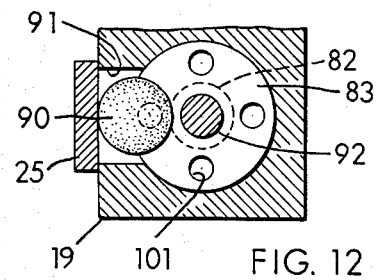
FIG. 12 is a cross sectional view illustrating the water soluble tablet chamber.
Figure 14:
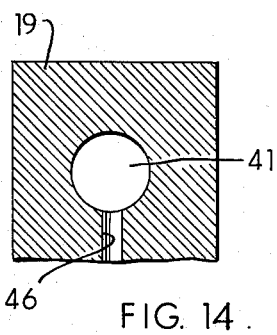
FIG. 14 is a partial, cross sectional view illustrating the manner of interconnecting passage between the pressure testing chamber and the sealing disc chamber.
Figure 10:
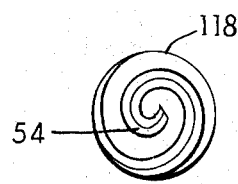
FIGS. 10 and 11 are top and front views, respectively, of the diaphragm puncturing needle.
Figure 11:
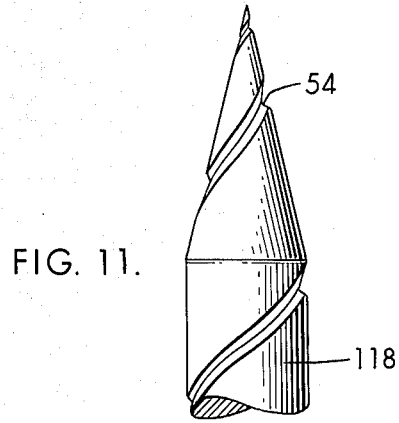

FIGS. 7, 8 and 12 illustrate the manner in which the inflating device 11 of the present invention may be adapted for automatic operation. Housing 19 is provided with a bore 28 within which a slide is positioned. The slide comprises a pair of spaced disc members 83 and 84 connected by link 92 and arranged to be disposed adjacent slot 91 in the side of the housing 19. The members 83 and 84 are conveniently spaced so as to receive a readily soluble pellet 90. Pellet 90 may be of any suitable water soluble material presently available on the market and is adapted to be slipped into opening 91 when slide 25 raises. After the pellet is inserted, screw 26 holding slide 25 is loosened slightly while slide 25 is positioned over the slot 91, after which the screw 26 is tightened.

As shown in FIG. 7, a spring 85 is positioned within bore 28 and exerts a downward force on the top disc 84 of the slide so that the head member 82 bears against the cam surface 80 of the lever 75. Discs 83 and 84 are provided with a plurality of drilled openings therethrough in order that water entering through the lower end of the bore 28 will rapidly fill up the entire bore when the inflating device is immersed. When water enters bore 28, pellet 90 rapidly dissolves losing its sheer resistance strength so that spring 85 can move the slide downward. The base surface 81 bears against the lever 75 causing it to rotate counterclockwise about pin 75 thus raising the piercing pin 118 and puncturing the diaphragm in a manner hereinbefore described.

When non-automatic actuation of the floatation equipment is desired, a non-soluble pellet can be substituted for the soluble pellet 90. Such a non-soluble pellet should be distinctly colored so that no confusion can arise as to the type of pellet being used.

In accordance with the foregoing description, it is apparent that the present invention provides a new and novel apparatus for testing the charge of a compressed gas cartridge used for inflating floatation equipment comprising an easily puncturable disc or diaphragm placed at the bottom of a small elongated chamber. This disc seals the orifice leading to the floatation equipment so that the compressed gas cartridge may be pierced causing a small portion of its charge to enter the sealed chambers. The disc is maintained firm by a hold down plug which is constructed such that the charge, when released upon piercing of the diaphragm, flows through the bottom of the hold down plug through openings provided for this purpose into the connecting passages leading to the floatation equipment.

The present invention is readily adapted for automatic and/or manual operation wherein the charge of the compressed gas cartridge may be tested or sensed at all times to provide a test of the operability of the cartridge.

Although one particular embodiment of the invention has been described, it will be obvious to those skilled in the art that many modifications may be made, and the method and means of sensing the partially released charge in the sealed chamber is not limited to the use of pull bar construction. For example, a small pressure guage in communication with the sealed chamber may be utilized to indicate the number of pounds of pressure therein or a pressure sensitive indicator, such as a button type arrangement which would extrude when the chamber is pressurized and would retract when the pressure is released from the sealed chamber. Such arrangements can advantageously be utilized with various forms of equipment which incorporate a compressed gas cartridge to test the operability of the cartridge without destroying its usefulness. It is therefore intended by the appended claims to cover all such modifications which fall within the true spirit and scope of the invention.

What is claimed is:

1. A device for inflating floatation equipment comprising a housing, a first chamber in said housing, a compressed gas cartridge in said chamber, a needle in said chamber for piercing said cartridge, a second chamber, a channel in said housing opening said first chamber to said second chamber, said second chamber having an orifice opening to said floatation equipment, a diaphragm in said second chamber sealing said floatation equipment from the charge of said compressed gas cartridge and maintaining a portion of said charge in said first chamber when said cartridge is pierced, a needle in said second chamber for piercing said diaphragm and manual means supported by said housing adapted to displace said needle to thereby pierce said diaphragm and release the charge from said cartridge and chambers to said floatation equipment.

2. A device as set forth in claim 1 wherein said needle in said first chamber is adapted to oppose the pressure of said portion of said charge in said first chamber and further includes a manually operable lever adapted to displace the needle in said first chamber for piercing said capsule, a pivot for said lever and force means for returning said lever and said needle in said first chamber to its original position after said cartridge is pierced.

3. A device as set forth in claim 2 wherein said force means includes a compression spring supported in said first chamber, said spring being adapted to act against said needle to maintain said needle in a retracted position, said lever being adapted to overcome the force of said spring upon manual operation thereof to thereby displace said needle and pierce said cartridge.

4. A device as set forth in claim 1 wherein said manual means includes a lever, a pivot for said lever and further including a third chamber, a slide in said chamber, a spring supported in said third chamber, an opening in said third chamber adapted to receive a soluble pellet for holding said slide against movement by said spring, said slide engaging said lever to cause said lever to be rotated about its pivot when said pellet dissolves to thereby cause said diaphragm to be punctured.

5. A device as set forth in claim 4 wherein said needle in said first chamber is adapted to oppose the pressure of the portion of said charge in said first chamber and further includes a manually operable lever adapted to displace the needle in said first chamber for piercing said capsule, a pivot for said lever and force means for returning said lever and said needle in said first chamber to its original position after said cartridge is pierced.

6. In a device for inflating flotation equipment having a chamber, a compressed gas cartridge in said chamber, a needle in said chamber for piercing said cartridge and a passage from said chamber opening into the flotation equipment, the improvement comprising means for testing for the presence of a charge within said chamber including a diaphragm for sealing off said chamber from said floatation equipment and maintaining a portion of said charge from said cartridge within the chamber after said cartridge is pierced, manual actuable means in said chamber adapted to oppose the pressure of said portion of charge, and means supported in said housing operable to puncture said diaphragm and release the charge from said cartridge to said flotation equipment.

7. A device as set forth in claim 6 wherein said manual means in said chamber adapted to oppose the pressure of said charge includes a manually operable lever adapted to displace said needle, a pivot for said lever and a compression spring in said chamber adapted to return said lever and said needle to its orignial position after said cartridge is pierced.

8. A device as set forth in claim 6 wherein said means operable to puncture said diaphragm includes a second chamber, said diaphragm being disposed in said second chamber, a needle in said second chamber and manual means supported on said housing for causing said needle to puncture said diaphragm.

9. A device as set forth in claim 8 further including a third chamber, a slide in said third chamber, a spring supported in said third chamber, an opening in said third chamber adapted to receive a soluble pellet for holding said slide against movement by said spring, said slide engaging said lever for pivotal movement when said pellet dissolves to thereby cause said diaghragm to be punctured.

10. A device for inflating floatation equipment and testing the charge of a charging cartridge comprising a housing, first, second and third spaced parallel chambers in said housing, a channel interconnecting said first and second chambers, said second chamber adapted to be connected to the floatation equipment for translating the charge of the cartridge to said floatation equipment, a compressed gas cartridge in said first chamber, a retractable needle in said first chamber, force means in said first chamber for maintaining said needle in its retracted position, manual means in said first chamber for overcoming the force of said force means for displacing said needle and piercing said cartridge, sealing means disposed in said second chamber for confining the charge of said cartridge after the cartridge is pierced, a needle in said second chamber for piercing said sealing means, manual and automatic means for actuating said needle in said second chamber, said manual actuating means including a lever, a pivot for said lever, said automatic actuating means including a slide in said third chamber, a spring in said third chamber, and an opening in said third chamber adapted to receive a water soluble pellet in said opening for holding said slide against movement by said spring, said slide engaging said manual actuating means for rotating said lever about its pivot upon movement of said spring.

11. A device as set forth in claim 10 wherein said sealing means comprises a plug, an opening in said plug, said opening being in communication at one end thereof with said channel, the other end of said opening adapted to be placed in communication with said floatation equipment through said second chamber and a diaphragm supported by said plug for sealing said other end of said opening, said diaphragm adapted to be pierced by said needle in said second chamber.

12. The method of testing for the availability of a charge of a compressed gas cartridge adapted to inflate flotation equipment and then inflating said equipment comprising the steps of:
(a) releasing a portion of the charge from the cartridge;
(b) entrapping said portion of the released charge in a chamber sealed-off from the floatation equipment;
(c) applying a force in opposition to the pressure of the entrapped portion of the charge for indicating the presence of the entrapped portion of the charge;
(d) establishing communication between the sealed-off chamber and the floatation equipment and releasing the entrapped portion of the charge and the remainder of the charge within said cartridge to said floatation equipment for inflation thereof.

13. Apparatus for testing the operability of a compressed gas cartridge adapted to release its charge to fill a charge receiving article comprising a housing for supporting the cartridge, at least one chamber in said housing having a seal to seal-off the chamber from the charge receiving article, said chamber being in communication with one end of said cartridge for confining a portion of the charge adapted to be released from within the cartridge, piercing means supported by said housing for piercing the cartridge at said one end and releasing a portion of the charge to the sealed-off chamber, pressure sensing means in communication with said sealed chamber for sensing the presence of the charge in the sealed chamber after the cartridge has been pierced and means in said housing for breaking the seal in said sealed chamber and establishing communication between the chamber and the charge receiving article.

14. Apparatus for testing the operability of a compressed gas cartridge adapted to release its charge to fill a charge receiving article comprising a housing for supporting the cartridge, at least one chamber in said housing having a seal to seal-off the chamber from the charge receiving article and confine a portion of the charge from within the cartridge, passage means in said housing for maintaining said sealed chamber in communication with one end of said cartridge, piercing means supported adjacent said one end of said cartridge for piercing said cartridge to release a portion of the charge of the cartridge into the sealed chamber, pressure sensitive indicating means in communication with the confined portion of the charge from within the cartridge for indicating the presence of charge after the cartridge has been pierced and means supported by said housing for destroying the seal in said chamber and establishing communication between said chamber and the charge received article.

15. The apparatus as set forth in claim 14 further including a channel connecting the charge receiving article to said chamber, said seal being a diaphragm disposed across said channel and said means for destroying said seal comprising an actuable piercing pin adapted to puncture said diaphragm upon actuation thereof.

16. The method of testing for the availability of a charge of a compressed gas cartridge adapted to inflate floatation equipment and inflating said equipment comprising the steps of:
(a) releasing a portion of the charge from the cartridge,
(b) confining said portion of the released charge in a chamber sealed-off from the floatation equipment,
(c) sensing for the presence of the confined portion of the charge by reducing the size of said sealed-off chamber and measuring the opposition of the confined portion of the charge to an externally applied force,
(d) establishing communication between the sealed-off chamber and the floatation equipment and releasing the confined portion of the charge and the remainder of the charge within said floatation equipment for inflation thereof.

17. The method of testing the operability of a compressed gas cartridge adapted to inflate floatation equipment without destroying its usefulness so that its charge may be expended to a charge receiving article connected thereto and then releasing said charge to said article comprising the steps of:
(a) piercing the compressed gas cartridge,
(b) sealing-off a portion of the compressed gas from within the cartridge when said cartridge is pierced in a variable volume sealed chamber,
(c) sensing for the presence of the pressure of the sealed-off portion of the compressed gas released from within the cartridge by reducing the volume of the sealed chamber,
(d) esablishing communication between the sealed-off portion of compressed gas and the charge receiving article, and
(e) releasing the sealed-off portion of compressed gas and the remainder of compressed gas within said cartridge to the charge receiving article.

References Cited by the Examiner
UNITED STATES PATENTS

| | | | |
|---|---|---|---|
| 983,962 | 2/1911 | Werner | 73—52 X |
| 1,226,857 | 5/1917 | Brokaw | 9—319 |
| 1,640,911 | 8/1927 | Skoog | 73—52 |
| 2,722,342 | 1/1955 | Fox | 222—5 |
| 3,059,814 | 10/1962 | Poncel et al. | 222—5 |

References Cited by the Applicant
UNITED STATES PATENTS

| | | |
|---|---|---|
| 3,090,979 | 5/1963 | Segrest. |

FOREIGN PATENTS

| | | |
|---|---|---|
| 710,196 | 6/1954 | Great Britain. |

LOUIS J. DEMBO, *Primary Examiner.*

N. L. STACK, *Assistant Examiner.*